J. R. BUECHLER.
PATCH FOR PNEUMATIC TIRES.
APPLICATION FILED OCT. 29, 1919.
1,375,825.
Patented Apr. 26, 1921.
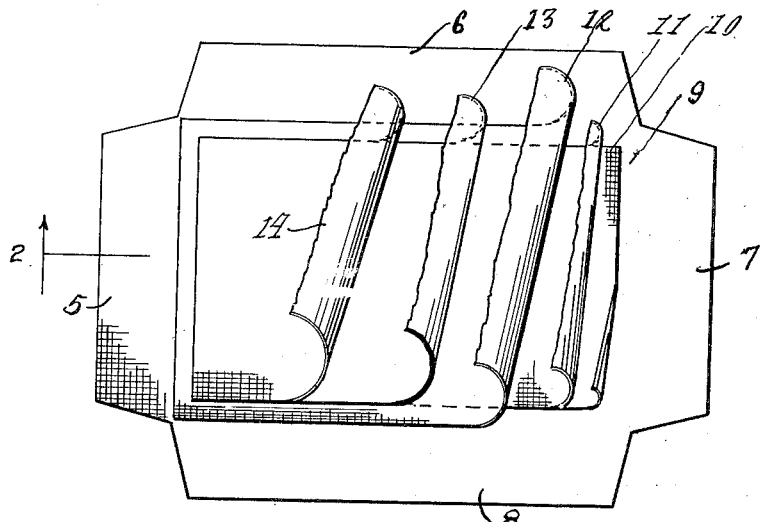
Fig. 1
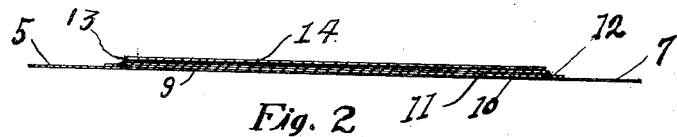
Fig. 2
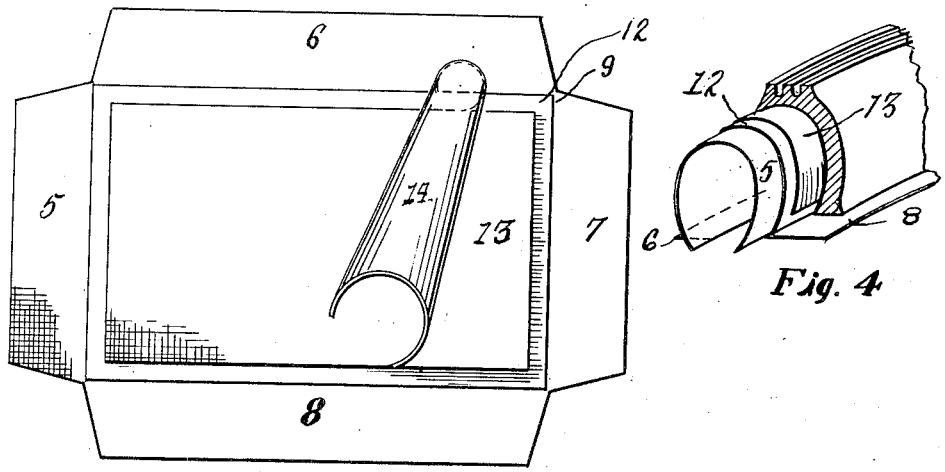
Fig. 3
Fig. 4
John R. Buechler
INVENTOR.
BY
ATTORNEY

UNITED STATES PATENT OFFICE.

JOHN R. BUECHLER, OF AKRON, OHIO.

PATCH FOR PNEUMATIC TIRES.

1,375,825.

Specification of Letters Patent.

Patented Apr. 26, 1921.

Application filed October 29, 1919. Serial No. 334,218.

*To all whom it may concern:*

Be it known that I, JOHN R. BUECHLER, a citizen of the United States, residing at Akron, in the county of Summit and State of Ohio, have invented new and useful Improvements in Patches for Pneumatic Tires, of which the following is a specification.

This invention relates to repair patches for pneumatic tire casings and has particular relation to the type of patch adapted to be placed between the inner tube and the casing of such tires.

One of the objects of the invention is to provide an unformed repair patch for pneumatic tires of great durability which can be easily and economically manufactured.

Another object is to provide a flat patch of the class described that will readily conform to the size and contour of the interior of the casing in which it is used.

A further object is to provide a patch which will adhere to and become an integral part of the casing and which is constructed so that it may be used in a tire without injury to the inner tube.

A still further object is to provide a patch which may be constructed in one size and which is adapted to be used in tires of different sizes so that one sized patch may be manufactured that will fit all ordinary makes and sizes of tires.

The above objects and others are accomplished by the novel construction, combination and arrangement of parts hereinafter specifically described and illustrated in the accompanying drawings which form a part hereof wherein is shown a preferred embodiment of the invention, but it is to be understood that changes, variations and modifications may be resorted to which come within the scope of the claims hereunto appended.

In the drawings in which like characters of reference are used to indicate corresponding parts in the several views:

Figure 1 is a plan view of a patch constructed in accordance with this invention having the successive layers of which it is composed turned back to clearly illustrate the manner of construction.

Fig. 2 is a cross sectional view, the same taken approximately on line 2, Fig. 1.

Fig. 3 is a plan view of the patch having the protective covering partly removed.

Fig. 4 is a perspective view of a portion of a tire illustrating the manner of positioning the patch therein.

Referring now to the drawings in detail, a patch constructed in accordance with this invention has a main body portion which is preferably rectangular in outline and is provided on its four sides with outwardly extending marginal flaps 5, 6, 7, and 8. The patch is constructed flat and is substantially longer than it is wide, so that when the flaps 5 and 7 are bent together, the patch will fit a series of sizes of tires, and when the flaps 6 and 8 are bent together, the patch will fit a different series of sizes of tires. When positioned within the tire the flaps 6 and 8 will extend under the face of the tire when positioned in a small sized tire and the flaps 5 and 7 are positioned under the base of the tire when the patch is used in a relatively larger sized tire.

It will thus be seen that two opposing flaps will extend longitudinally from the patch when it is placed in the casing and two opposing flaps will be positioned under the base of the tire as shown in Fig. 4.

The patch is built up of a plurality of superposed layers of rubberized textile fabric having inner and outer and a plurality of intermediate plies of fabric, and is provided on its outer face with a panel of unvulcanized rubber gum. The inner layer of fabric 9 is fashioned to provide the outwardly extending flaps 5, 6, 7, and 8. Superposed on the inner layer 9 are a plurality of contiguous layers of fabric 10, 11, and 12, the layer 12 being substantially smaller than the layer 9 and the plurality of intermediate layers 10 and 11 being substantially smaller than the layer 12 so that a margin of the layer 12 extends over the plurality of plies 10 and 11 and its margin is adhesively united to the layer 9. Positioned upon the layer 12 is a layer of unvulcanized rubber gum 13 which is substantially smaller than the layer 12, providing a marginal border around the layer 13. The layer 13 is plastic and sticky and is protected by a sheet of holland or other non-porous material 14 which is removed when the patch is used.

An important feature of a patch constructed in accordance with my invention is that the several plies thereof are adhesively united by means of unvulcanized rubber in a plastic state. The feature makes it possible to manufacture a flat patch so that it can be arched longitudinally or laterally and in either case will readily conform to the contour of the tire. In placing the patch in the tire casing to prevent the inner tube from blowing out through a break in the casing, the unvulcanized rubber face of the patch will adhere to the edges of the break and hold them together, thus preventing an enlargement thereof.

In use the patch is placed in the casing with the unvulcanized rubber face in contact with the interior surface of the casing and two opposing flaps are brought down under the base of the tire so that when the inner tube is inserted and inflated the edges of the flaps will be securely held between the base of the tire and the rim. The plastic face of the patch will adhere to the inner surface of the casing and will prevent the patch from being blown out through a rent in the casing.

From the above description, it will be readily understood that I have provided a patch of economical construction which possesses numerous and important advantages over any patch heretofore known.

It will be noted that I have provided an unformed patch in contradistinction to a preformed shoe or patch.

The difference in the practical use of the article is very important. A preformed patch made to fit a tire of a certain size is limited in use and is unsatisfactory in several results. A preformed patch must be made in a great variety of sizes for different sizes of tires, thus requiring the merchant to keep on hand a large stock in order to meet the demand for different sizes.

Having thus described my invention what I claim as new and desire to secure by Letters Patent is:—

1. An article of manufacture, an unformed repair patch for pneumatic tires, comprising a body portion of flexible textile material of substantially rectangular shape and of different diameters in length and width and provided with a central panel of attaching cement, all of the edges of said body portion being left free and uncovered by the attaching cement to afford attaching means for said patch, whereby the patch may be applied in different positions transversely of the tire to fit tires of varying sizes.

2. As an article of manufacture, an unformed repair patch for pneumatic tires, comprising a body portion of flexible material of substantially rectangular shape and of different length and width and provided with a central panel of attaching cement, attaching flaps projecting from all of the edges of said body portion beyond said cement panel, whereby the patch may be applied in different positions transversely of the tire to fit tires of varying sizes.

3. A patch of the class described, comprising a flat rectangular body composed of a plurality of superposed layers of textile fabric adhesively united by means of unvulcanized rubber and comprising an inner layer, an outer layer and a plurality of intermediate layers, the inner layer being substantially larger than the outer layer and the outer layer substantially larger than the intermediate layers, the said outer layer being provided with a plastic panel of unvulcanized rubber gum adapted to adhesively attach the patch to the interior surface of a pneumatic tire casing, and means to additionally hold said body in position in a tire, said means comprising non-adhesive flaps which project outwardly from each of the four sides of said body, so that the flaps on opposing sides may be impinged between the base of the tire and the tire rim.

4. As an article of manufacture an inner tire boot of the class described, comprising a flat rectangular body composed of a plurality of plies of textile fabric adhesively united by means of unvulcanized rubber and having a length adapted to fit tires of one series of sizes and a breadth adapted to fit tires of another series of sizes, said body having an attaching face provided with a panel of unvulcanized rubber gum adapted to adhesively unite the said face to the interior surface of a pneumatic tire casing, and provided on each of its four sides with an outwardly projecting uncemented flap, whereby the patch may be applied in different positions transversely of the tire to fit tires of various sizes.

5. A tire patch comprising a flexible unformed body portion composed of a plurality of layers of textile fabric adhesively united by means of unvulcanized rubber and provided on each of its four sides with an outwardly projecting flap, said patch having a length adapted to fit tires of one series of sizes and a width adapted to fit tires of another series of sizes, whereby the patch may be applied in different positions transversely of the tire to fit the different sizes of tires.

In testimony whereof I have hereunto set my hand.

JOHN R. BUECHLER.